United States Patent
Vollmann

[19]

[11] Patent Number: 6,122,137
[45] Date of Patent: Sep. 19, 2000

[54] LOADING MECHANISM FOR A RECORDING AND REPRODUCING APPARATUS WHEREIN A SWITCH MECHANISM AND THE LOADING MECHANISM ARE A SINGLE UNIT

[75] Inventor: Norbert Christian Vollmann, Eindhoven, Netherlands

[73] Assignee: OnStream, Inc., Loveland, Colo.

[21] Appl. No.: 09/091,712

[22] PCT Filed: Oct. 21, 1997

[86] PCT No.: PCT/IB97/01316

§ 371 Date: Jun. 22, 1998

§ 102(e) Date: Jun. 22, 1998

[87] PCT Pub. No.: WO98/18125

PCT Pub. Date: Apr. 30, 1998

[30] Foreign Application Priority Data

Oct. 21, 1996 [EP] European Pat. Off. ............... 96202934
Oct. 21, 1996 [EP] European Pat. Off. ............... 96202935

[51] Int. Cl.[7] .................................................. G11B 5/008
[52] U.S. Cl. ............................................................ 360/96.5
[58] Field of Search .............................................. 360/96.5

[56] References Cited

U.S. PATENT DOCUMENTS 5,172,285  12/1992  Kox ........................................ 360/96.5
5,231,553   7/1993  Weber ..................................... 360/96.5
5,373,406  12/1994  Jansen ..................................... 360/96.5
5,379,168   1/1995  Kage ....................................... 360/96.5
5,440,435   8/1995  Busengdal ............................... 360/96.5

*Primary Examiner*—A. J. Heinz
*Attorney, Agent, or Firm*—Welsh & Katz, Ltd.

[57] ABSTRACT

An apparatus for recording and/or reproducing information on/from an information carrier accommodated in a cartridge comprises a chassis, a cartridge room in which the cartridge can be brought, a loading mechanism by means of which the cartridge can be urged from a loading position into its operational position in the cartridge room and a drive mechanism including a drive member for driving the information carrier via a driveable device of the cartridge. By means of a switch mechanism the drive member and the driveable device are in contact with each other for driving the driveable device into a stand-by position when the information carrier in the cartridge is in the state of treat and vice versa. The switch mechanism and the loading mechanism are combined to form one single unit.

11 Claims, 4 Drawing Sheets

LOADING MECHANISM FOR A RECORDING AND REPRODUCING APPARATUS WHEREIN A SWITCH MECHANISM AND THE LOADING MECHANISM ARE A SINGLE UNIT

The present invention relates to an apparatus for recording and/or reproducing information on/from an information carrier accommodated in a cartridge, which apparatus comprises a chassis, a cartridge room in which the cartridge can be brought and which is accessible via an opening in a wall of the apparatus, a loading mechanism by means of which the cartridge can be forced from a loading position into its operational position in the cartridge room, a drive mechanism including a drive member for driving the information carrier via a drivable device of the cartridge, said drive member being in an operational position in which the drive member and the drivable device are in contact with each other for driving the drivable device and in a stand-by position when the information carrier in the cartridge is in the state of rest, and a switch mechanism for bringing the drive member from the operational position into the stand-by position and vice versa.

Such an apparatus is known from EP-A-0633568. In this known apparatus both the loading mechanism and the switch mechanism are independent of each other and are driven by a separate motor. The loading mechanism and the information carrier are driven by one and the same motor.

A switch mechanism for bringing the drive member from an operational position into a stand-by or retracted position was already known from U.S. Pat. No. 4,324,355. In that document the background problem is described. If the drive member remains in contact with the drivable device when the information carrier is not transported, the drive member, being a motorically driven roller of elastomeric material, becomes deformed or out of round, thereby developing flat spots that interfere with the steady or uniform drive of the information carrier. In said US-document the switching mechanism is formed by a solenoid controlled spring mechanism by means of which pinch rollers can be urged against and retracted from a pair of capstans. From EP-A-0109154 it is known to urge the drive member against and to retract the drive member from the drivable device of the cartridge by means of a manually controlled blocking mechanism for the opening of the cartridge room. In U.S. Pat. No. 5,372,321 the drive mechanism for the information carrier is retracted from the drivable device by means of an actuator and urged against the drivable device by spring force.

It is a purpose of the present invention to provide for an apparatus as described in the opening paragraph, in which loading a cartridge and bringing the drive mechanism in the operational position can be performed in an effective and reliable manner, independent of the drive of the information carrier.

According to the invention the apparatus is therefore characterized in that the switch mechanism and the loading mechanism are combined to form one single unit. This measure has the advantage that one motor can be used for driving the loading mechanism and the switch mechanism and that loading of the cartridge is directly coupled to bringing the drive mechanism from the stand-by position into the operational position.

In a specific embodiment said single unit comprises a displaceable gripper which can be brought into a first position, said first position being the loading position in which the cartridge is engaged, into a second position in which the cartridge and the drive member are in their respective operational positions, and into a third position in which the cartridge is in its operational position and the drive member in the stand-by position. By controlling one mechanical element, viz. the gripper, a cartridge being griped can be brought into its operational position, the drive member can be brought into contact with the drivable device of the cartridge and the latter contact can be broken by retracting the drive member after that the information carrier is not transported any longer.

In order to bring the gripper in the above mentioned positions, it is of advantage when coupling means are provided by means of which the gripper can hingeably engage the cartridge to be loaded.

As it is of advantage to move the cartridge from the loading position to its operational position in the apparatus with a comparatively high speed and to move the drive member into contact with the drivable device of the cartridge with a comparatively low speed, said single unit further comprises an electric motor mounted on the chassis and a wheel drivable by said motor and having an first bearing surface which co-operates with a second bearing surface part, the latter surface being part of the gripper and comprising a first bearing surface part which is directed to the opening in the cartridge room and a second bearing surface part extending approximately perpendicular to said first bearing surface part.

In a preferred embodiment the drive mechanism can be released from the drivable device and be brought into contact therewith by rotation; therefore the gripper further includes a third bearing surface, co-operating with a fourth bearing surface on the drive mechanism, whereby the drive mechanism rotates to and from the drivable device of the cartridge with respect to said third bearing surface when the first bearing surface moves along the second bearing surface part of the second bearing surface. In this construction the third bearing surface is directed under such a relatively small angle with respect to the second bearing surface part, that after stopping the transport of the information carrier the gripper is rotated as a consequence of the movement of the first bearing surface along the second bearing surface of the second bearing surface, while the drive mechanism is rotated over a relatively small angle in order to come free from contact with the drivable device of the cartridge.

In a specific embodiment the drive mechanism includes a motor for driving the drive member for the drivable device of the cartridge, and a pinlike element including said fourth bearing surface and being provided on the motorhouse, the fourth bearing surface of which pinlike element being slidable along the third bearing surface.

In order to obtain an appropriate guide for the gripper movement a fifth bearing surface is provided comprising a third bearing surface part which is directed to the opening in the cartridge room, and a fourth bearing surface part which extends approximately perpendicular to said third bearing surface part, the third and fourth bearing surface parts co-operating with the gripper. These third and fourth bearing surface parts form part of the chassis, while the gripper is provided with a pinlike element co-operating with said third and fourth bearing surface parts.

According to a further aspect of the invention the first bearing surface comprises a first gearing, the second bearing surface comprises a second gearing, both gearings engaging each other.

The invention also relates to a system for recording and/or reproducing information, comprising an apparatus in accordance with the invention and a cartridge provided with an information carrier.

The invention will now be described in more detail, by way of example, with reference to the drawings, in which FIG. 1 is a diagrammatic plan view of an embodiment of the apparatus in accordance with the invention, with the gripper of the apparatus in a loading position;

Figure 1:
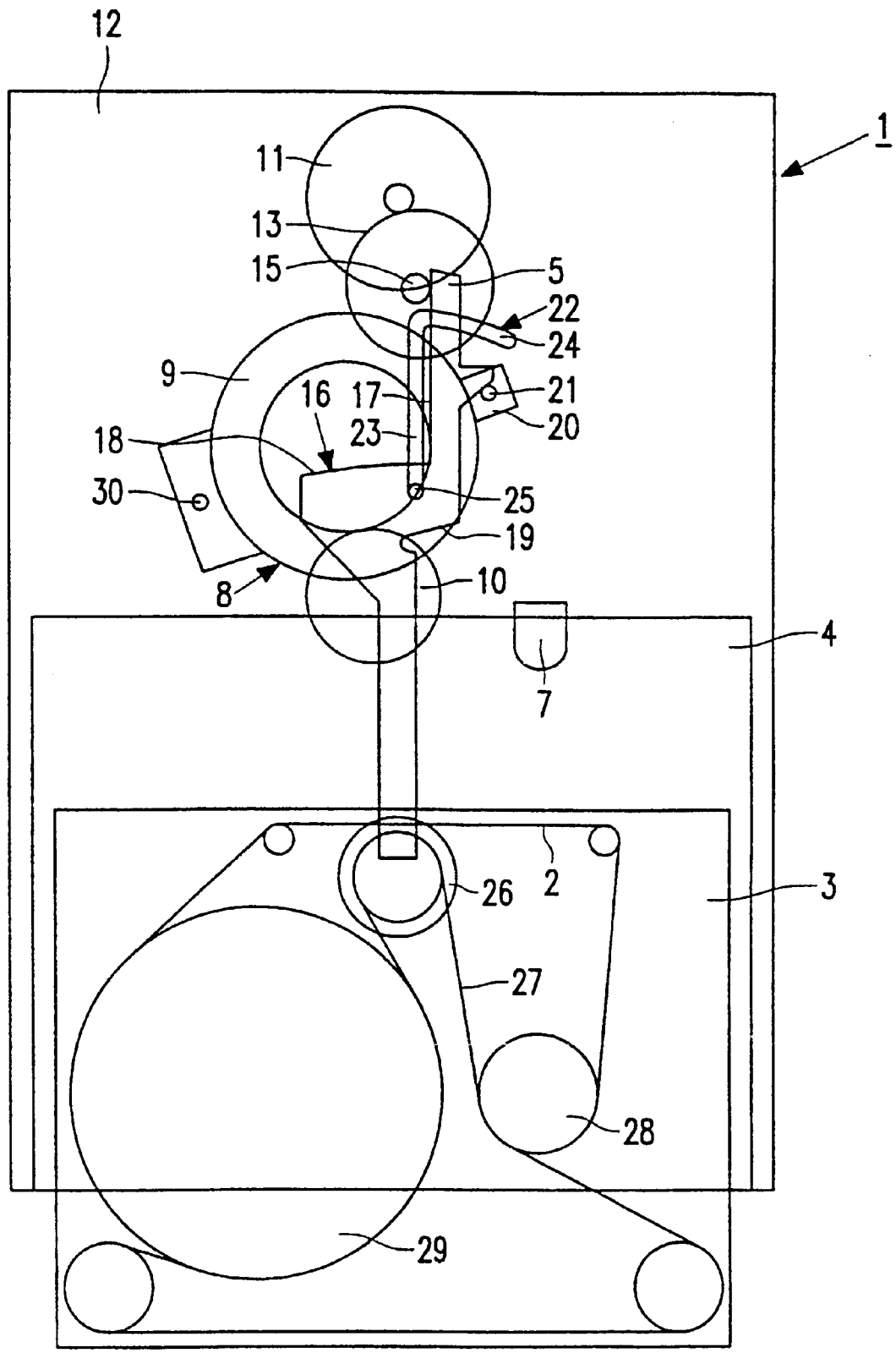
Figure 2:
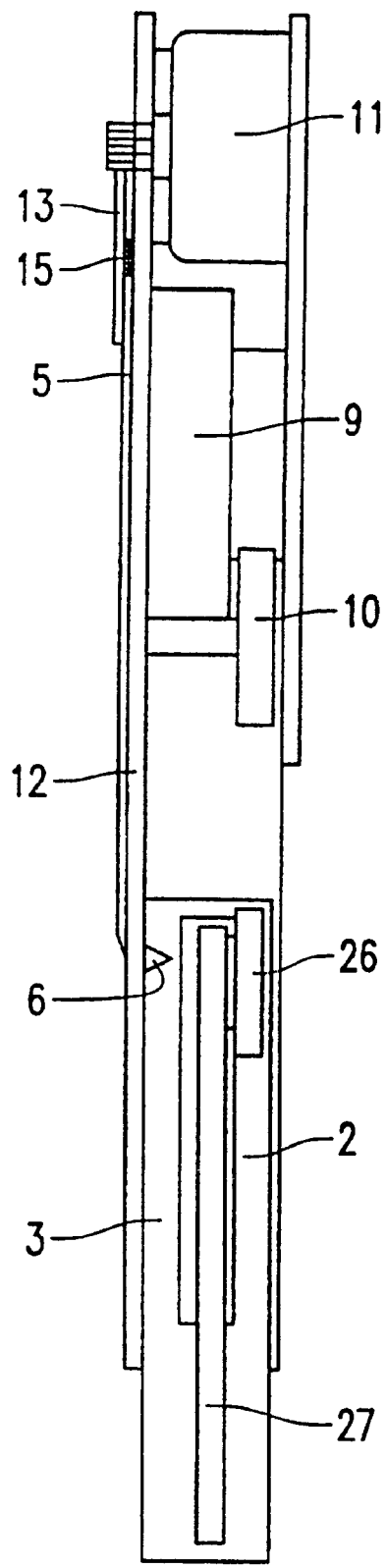
FIG. 2 is a side view in the longitudinal direction of this embodiment.

The figures show diagrammatically the apparatus 1 in accordance with the invention in the form of a 3 inch tape drive. The apparatus 1 is a recorder for recording information on an information carrier 2 in the form of a magnetic tape accommodated in a cartridge 3. The apparatus has a cartridge room 4 for receiving the cartridge 3 and a gripper 5 for engaging a cartridge 3 inserted into the apparatus through an opening in the front wall. The inserted position wherein the cartridge 3 can be engaged by the gripper 5 is indicated as the loading position. To retain the cartridge 3 the gripper 5 has a resilient projection 6 which co-operate with a recess in the cartridge 3. In the loading position the end of the gripper 5 with the resilient projection 6 are movable in the up- en downward direction, i.e. the direction to and from the cartridge 3. When the cartridge 3 is engaged by the gripper 5 and the drive motor for the loading mechanism is activated, the up- and downward movement of the gripper 5 is blocked. When the cartridge 3 is brought into the cartridge room 4, the resilient projection 6 is urged downwards against the force of a spring element (not shown in the figures) and falls subsequently in a recess in the cartridge 3. When the gripper 5 pulls the cartridge 3 out of the cartridge room 4 the resilient projection 6 is urged downwardly and can be taken out by hand. The apparatus 1 further comprises a magnetic head 7, a drive mechanism 8, including an electric drive motor 9 and a drive member 10 in the form of a roller, a further electric motor 11 mounted on the chassis 12 of the apparatus and a wheel 13 co-operating with the motor 11 and being in an engaging relationship with the gripper 5. The motor 11, the wheel 13, the gripper 5 form together a single unit 14, by means of which the cartridge 5 is moved from the loading position (FIG. 1) to its operational position (FIGS. 3 and 4), and the drive member 10 is moved from the operational position (FIG. 3) to the stand-by position (FIG. 4) and vice versa. So, the single unit 14 performs the function of a loading mechanism and the function of a switching mechanism. The single unit 14 is only driven by the motor 11. The motor 9 is used as a drive for the transport of the information carrier 2.

The apparatus 1 is provided with coupling means (not indicated in the figures) by means of which the gripper 5 can hingeably engage the cartridge 3. The gripper 5 is moved by the motor 11 via the wheel 13. Therefore, the wheel 13 is provided with a first bearing surface 15, in the present case a toothed surface, which co-operates with a second bearing surface 16 in the form of a gear rack and being part of the gripper 5. The second bearing surface 16 is constituted by a first bearing surface part 17, directed to the opening at the front side of the cartridge room 4, and a second bearing surface part 18, extending slightly curved and approximately perpendicular to the first bearing surface part 17. The radius of the curvature corresponds with the distance between the second bearing surface part 18 and the point where the cartridge 3 is hingeably engaged by the gripper 5. The gripper 5 further includes a third bearing surface 19 which is directed under a relatively small angle with respect to the second bearing surface part 18. This third bearing surface 19 can cooperate with a fourth bearing surface 20 of a pinlike element 21, mounted to the housing of the motor 9. On the chassis 12 a guide is provided, comprising a fifth bearing surface 22. The fifth bearing surface 22 is constituted by a third bearing surface part 23, directed perpendicular to the opening at the front side of the cartridge 3, and a fourth bearing surface part 24, extending slightly curved with the same centre of curvature as the second bearing surface part 18 and approximately perpendicular to the third bearing surface part 23. The gripper 5 is provided with a pinlike element 25 co-operating with the third and fourth bearing surface parts 23 and 24.

Figure 3:
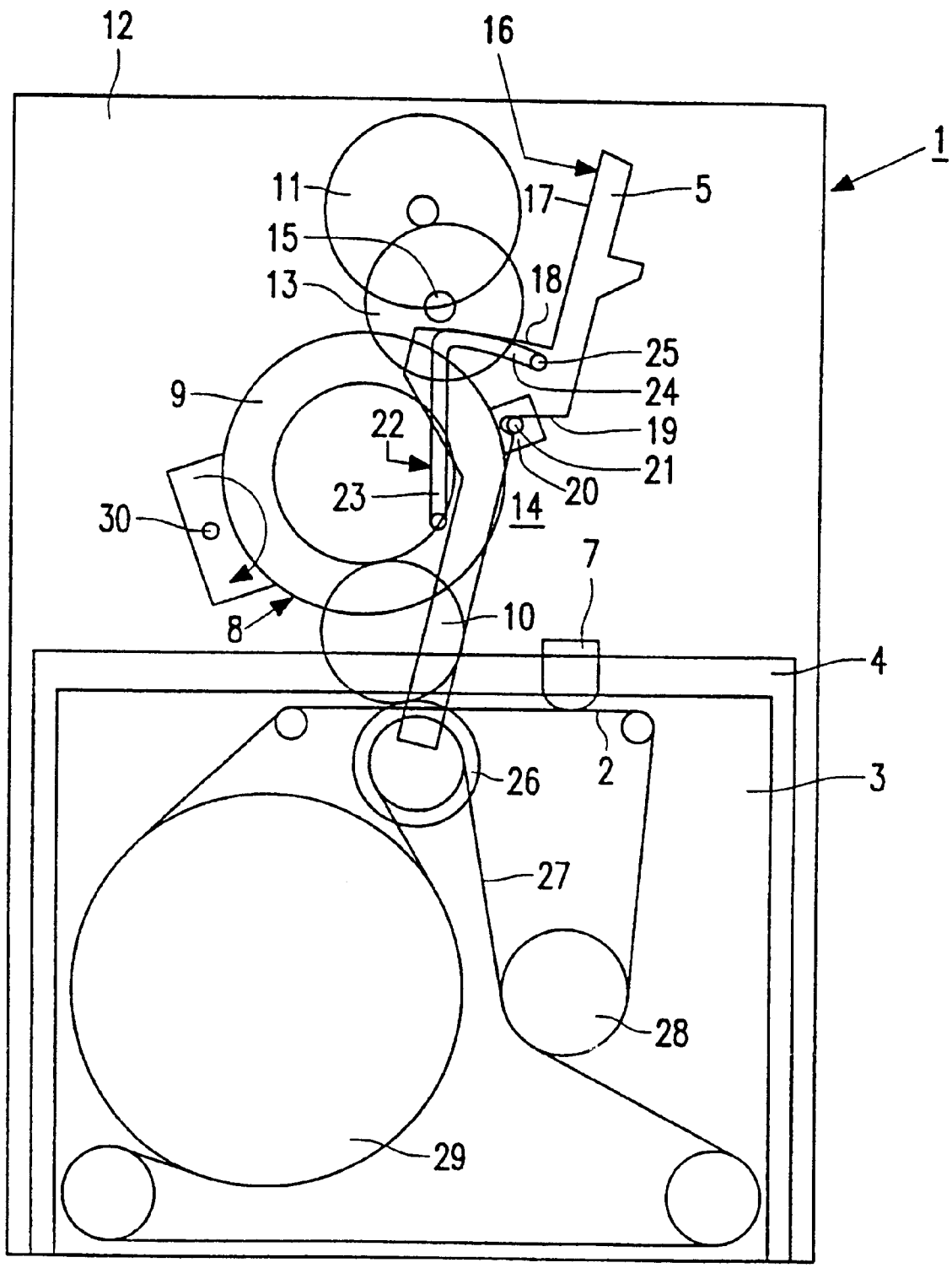
FIG. 3 is the same view as indicated in FIG. 1 with the cartridge and the gripper in the operational position
Figure 4:
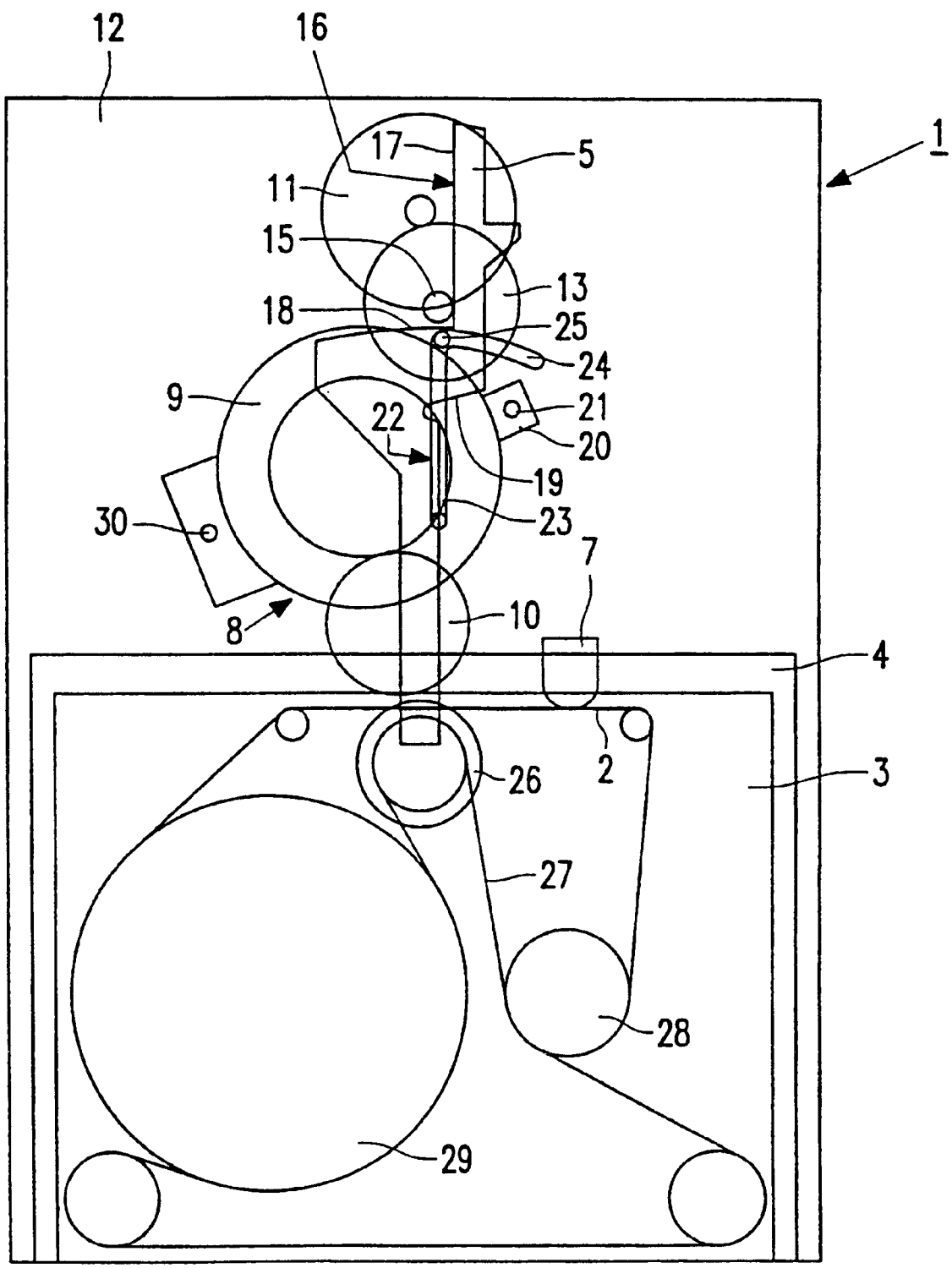
FIG. 4 is the same view again with the cartridge in its operational position and the gripper in the stand-by position.

When the gripper 5 is in a first position, i.e. the loading position (FIG. 1), and the cartridge 3 is engaged, the motor 11 will be energized. Then, the gripper 5 will be moved backwards with respect to the front side of the cartridge room 4, guided against the third bearing surface part 23, by a movement of the first bearing surface part 17 along the first bearing surface 15 of the wheel 13. When the first bearing surface part 18 comes into contact with the first bearing surface 15, the gripper 5 is in its most backward position, i.e. the third position in which the cartridge 3 is in its operational position and the drive member 10 in the stand-by position (FIG. 4). When transport of the information carrier 2 has to be started, the drive member 10 has to be moved from the stand-by into the operational position. Then, the gripper 5 will be rotated with respect to the point of engagement with the cartridge 3, guided against the fourth bearing surface part 24, by a movement of the second bearing surface part 18 along the first bearing surface 15 of the wheel 13. When the pinlike element 25 reaches the end of the fourth bearing surface part 24, the gripper 5 is in its most far rotated position, i.e the second position in which the cartridge 3 and the drive member 10 are in their respective operational positions (FIG. 3).

In the operational position of the cartridge 3 and the gripper 5, the drive member 10 is in contact with the drivable device 26 of the cartridge 3, while the magnetic head 7 is in contact with the information carrier 2. The drivable device 26, which has the form of a roller, drives in a known manner a flexible endless belt 27, which in its turn drives tape reels 28 and 29, as a result of which the information carrier 1 is moved past the magnetic head 7.

In the stand-by position of the drive mechanism 8, the drive motor 9 and the drive member 10 are in a somewhat retracted position in which the drive member 10 is free from contact with the drivable device 26. This retracted position is reached by a rotation of the drive mechanism 8 around a shaft 30, fixed on the chassis 12, urged by the movement of the fourth bearing surface 20 of the pinlike element 21 along the third bearing surface 19 during the rotation of the gripper 5 guided by the fourth bearing surface part 24. Thus, when the gripper is rotated and brought in operational position, the drive mechanism 8 is urged to rotate in the direction of the drivable member 26 and brought into contact therewith. The rotation of the drive mechanism 8 is a consequence of the fact that the third bearing surface 19 is somewhat tapered with respect to the second bearing surface part 18. When the gripper is moved again into the position indicated in FIG. 4, the third bearing surface 19 is released from the fourth bearing surface 20 of the pinlike element 21, and the drive mechanism 8 is rotated by a spring mechanism (not indicated in the figures) such that the drive member 8 is retracted such that the drive member 10 is released from the drivable member 26.

It is to be noted that the invention is not limited to an apparatus as described above. The invention can be used with similar advantages in an apparatus for the storage and/or reproduction on/from a dis-shaped information carrier in a cartridge. Moreover, other constructions of the gripper mechanism are possible. For example, the drive mechanism 8 can be retracted from the drivable device 26 by translation in stead of rotation, the pinlike element 25 can be rotatably mounted on the chassis 12, while in that case the fifth bearing surface 22 of the guide can be part of the gripper 5. Besides, it is also possible that the pinlike element 21 is monted to the chassis 12. In that case, in the second position of the gripper 5 (FIG. 3), the gripper 5 is in the stand-by position and the drive mechanism 8 is released from the drivable device 26, while in third position of the gripper 5 (FIG. 4), the gripper is in the operational position and the drive member 10 in contact with the drivable device 26.

Further, as described before, the retracted position is reached by a rotation of the drive mechanism 8 around the shaft 30. However, it is also possible that only the drive motor 9 is retracted by a rotation around the shaft 30 and that the drive member 10 is separately rotated around a similar shaft mounted sidewards the drive member 10 on the chassis 12.

In stead of only one resilient projection 6 at the end of the gripper 5 in the middle of the cartridge room 4, the end of the gripper 5 can be provided with a rotatable arm directed sidewardly, at the ends of which arms two resilient projections are mounted to cooperate with recesses at both sides in the cartridge 3.

I claim:

1. Apparatus for recording and/or reproducing information on/from an information carrier carried in a cartridge, said apparatus comprising:

a chassis;

a cartridge room for insertion of said cartridge through an opening in a wall of the apparatus;

a loading mechanism for loading the cartridge into an operational position in the cartridge room;

a drive mechanism including a first rotating member for driving the information carrier via a second rotating member, said first rotating member being in an operational position in which said first rotating member drives said second rotating member and in a stand-by position when the information carrier in the cartridge is in a state of rest, a switch mechanism for reciprocally moving the drive mechanism from the operational position to the stand-by position, wherein the switch mechanism and the loading mechanism are a single unit.

2. Apparatus according to claim 1 wherein one drive motor is provided for both the switching mechanism and the loading mechanism.

3. Apparatus according to claim 1 wherein the single unit comprises a displaceable gripper which can be brought into a first position, said first position comprising a loading position in which the cartridge is engaged, into a second position in which the cartridge and the drive member are in their respective operation positions, and into a third position in which the cartridge is in its operational position and the drive member is in the stand-by position.

4. Apparatus according to claim 3 wherein coupling means are provided by means of which the gripper can hingeably engage the cartridge to be loaded.

5. Apparatus according to claim 3, wherein said single unit further comprises an electric motor mounted on the chassis and a wheel driveable by said motor and having a first bearing surface which co-operates with a second bearing surface, the latter surface being part of the gripper and comprising a first bearing surface part directed to the opening in the cartridge room and a second bearing surface part extending approximately perpendicular to said first bearing surface.

6. Apparatus according to claim 5, wherein said gripper further includes a third bearing surface, co-operating with a fourth bearing surface on the drive mechanism, whereby the drive mechanism rotates to and from the driveable device of the cartridge with respect to said third bearing surface when the first bearing surface moves along the second bearing surface.

7. Apparatus according to claim 6, wherein said third bearing surface is directed under an angle with respect to the second bearing surface, so that after stopping the transport of the information carrier the gripper is rotated as a consequence of the movement of the first bearing surface along the second bearing surface part of the second bearing surface, while the drive mechanism is rotated over an angle to come free from contact with the driveable device of the cartridge.

8. Apparatus according to claim 6, wherein the drive mechanism includes a motor for driving the first rotatable member for the second rotatable member of the cartridge, and a pin element including said fourth bearing surface slidable along said third bearing surface.

9. Apparatus according to claim 5 further including a fifth bearing surface comprising a third bearing surface part directed to the opening in the cartridge room, and a fourth bearing surface part extending approximately perpendicular to said third bearing surface part, the third and fourth bearing surface parts co-operating with the gripper.

10. Apparatus according to claim 9, wherein the third and the fourth bearing surface parts form part of the chassis and the gripper is provided with a pin element co-operating with said third and fourth bearing surface parts.

11. Apparatus according to claim 5 wherein the first bearing surface comprises a first gearing, the second bearing surface comprises a second gearing, and said first and second gearings engage one another.

* * * * *